United States Patent [19]

Sahlin

[11] 4,213,364
[45] Jul. 22, 1980

[54] DEVICE FOR A PORTABLE POWER SAW

[76] Inventor: Hans O. Sahlin, Langsjovagen 21, Tyreso, Sweden, S-135 00

[21] Appl. No.: 938,451

[22] Filed: Aug. 31, 1978

[30] Foreign Application Priority Data

Sep. 5, 1977 [SE] Sweden ................................. 7709957

[51] Int. Cl.² ............................................. B27B 5/20
[52] U.S. Cl. ................................. 83/471.3; 83/486.1; 83/574
[58] Field of Search ..................... 83/471.3, 471.2, 485, 83/486, 486.1, 489, 574

[56] References Cited

U.S. PATENT DOCUMENTS

| 1,635,290 | 7/1927 | Skoglund | 83/486.1 |
| 2,346,146 | 4/1944 | Boice | 83/471.3 |
| 2,803,271 | 8/1957 | Shaw | 83/574 X |
| 2,903,026 | 9/1959 | Frydenlund | 83/471.3 X |
| 3,727,502 | 4/1973 | Steinman | 83/471.3 |
| 4,007,657 | 2/1977 | Burch | 83/471.3 |
| 4,062,390 | 12/1977 | Beekenkamp | 83/486.1 X |
| 4,133,237 | 1/1979 | Lewin | 83/471.3 X |

Primary Examiner—Frank T. Yost
Attorney, Agent, or Firm—Holman & Stern

[57] ABSTRACT

A device for guiding a portable power saw at a distance above a base plane, said base plane being arranged with a pivoting support member for the work piece, whereby the workpiece can be brought to take up desired angular relationship to the direction of guiding members for the saw, said guiding members being arranged hinged at one endportion and thus arranged to swing up from the base plane when a workpiece is introduced under same between distance members joining the base plane and the guiding members, and including a guide plate to which the power saw can be detachably attached, said guide plate incorporating guiding means co-acting with the guiding members, and also including means to hold the saw guard in a returned position, when the guide plate is in contact with the guiding members, arranged to automatically release the saw guard when the guide plate is moved from a contact position with the guiding members, said base plane also being arranged detachably connectable to a subplate in such a way, that the base plane can be turned in relation to the subplate, said subplate also being arranged with supporting means for a workpiece.

3 Claims, 5 Drawing Figures

DEVICE FOR A PORTABLE POWER SAW

BRIEF SUMMARY OF THE INVENTION

The present invention relates to a device for a portable power saw, intended to increase the field of use for the saw.

With regard to portable power saws, it is previously known to arrange the saw blade in such a way, that the angle from the contact surface can be alteredin order to make mitre cuts possible. It is thus possible, to achieve a cut, inclined downwardly from the upper surface of a work piece, which upper surface serves as a contact surface for the power saw. However, it is not possible to make a cut inclined from the surface of the work piece adjacent to the saw blade, e.g. when cutting a door frame, unless the saw cut is first indicated by a pencil line, whereafter the cut is made by manually guiding the power saw along the line. Alternatively, a supporting and guiding member can be attached to the work piece, e.g. by means of clamps, but such a method is extremely timeconsuming if desired accuracy should be obtained, and said clamping operation must also be repeated for each work piece. It is also desirable to perform other operations such as trim cutting with a portable power saw, and such operations are extremely difficult to perform without special auxiliary equipment of previously unknown type.

The use of portable power saws has increased considerably during the last few years, particularly within the building trade, but for the type of operations stated above, manually operated saws are often used, usually in combination with mitre fixtures of metal to which the saw is attached. Said type of tool is very expensive, and the manual cutting operation makes the work more effort and time consuming.

The purpose of the present invention is to disclose a portable device, intended to be used in connection with a conventional portable power saw, and the device increases the field of use for the saw considerably. Mitre operations of the type necessary for door frame dressings and similar are easily carried out, as well as trim cutting. The device according to the present invention increases thus the field of use for a portable power saw in such a way, that it corresponds to the field of use for a stationary circular saw of a larger type.

The characteristic features for the device according to the present invention are set forth in the main claim below and further characteristic features are also disclosed in the subclaims.

A basic embodiment of a device according to the present invention is more fully described below with reference to the accompanying drawings, also showing certain modifications intended to further increase the field of use for the device.

BRIEF DESCRIPTION

Figure 1:
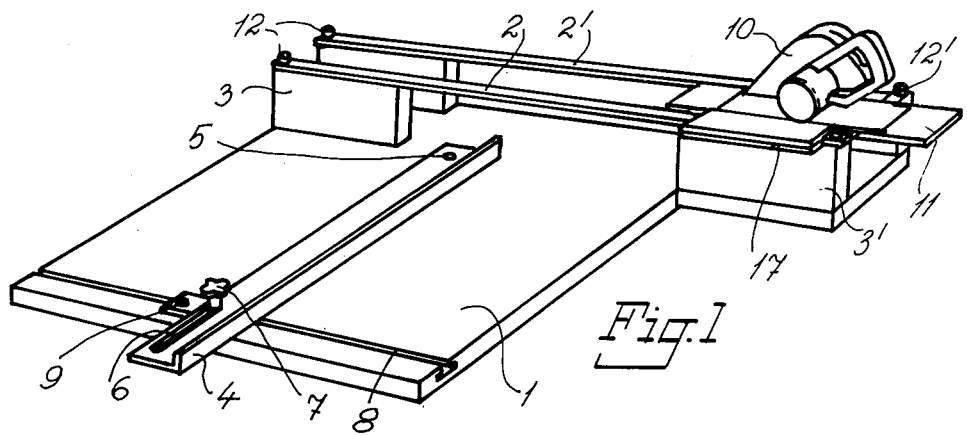
FIG. 1 is a perspective view of a basic embodiment of a device according to the present invention.
Figure 4:
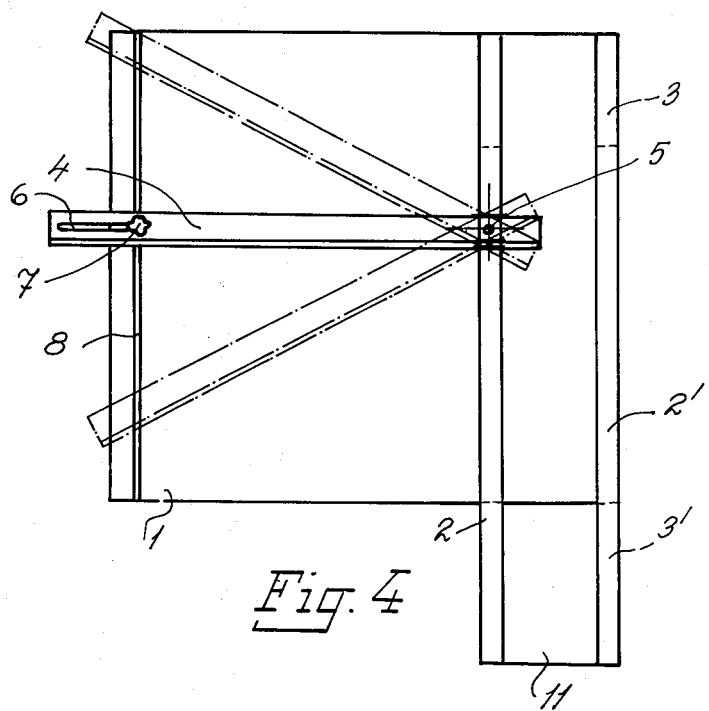
FIG. 4 is a view from above of the device according to FIG. 1 with the portable power saw and a guiding member removed.

With reference to the basic embodiment of a device according to the present invention as shown in FIG. 1, it includes a base plate 1, the present invention as shown in FIG. 1, it includes a base plate 1, having two longitudinally extending guiding members 2, 2' adjacent to one edge portion at a distance from the base plate 1 and in a parallel relationship to same. The guiding members 2, 2' are joined to the base plate 1 at each end portion by means of two distance members 3, 3'. A support member 4 is arranged pivoting around a stud means 5, said stud means 5 preferably being arranged under or adjacent to the guiding members 2, 2', from which the support member extends. The free end portion of the support member 4 directed from the guiding members 2, 2' is in the shown embodiment arranged with a through slot 6, through which a locking means 7 extends down into a T-groove 8 arranged in the base plate 1. The support member can thus pivot around the stud 5 to any desired angular relationship to the longitudinal direction of the guiding members 2, 2', as shown in FIG. 4, and be locked in desired position by means of the locking member 7, which is moveably arranged in the T-groove 8. A position of adjustment which is used often, e.g. at right angle in relation to the extending direction of the guiding means 2, 2', can also be preset by means of a stop member 9, adjustably moveable in the T-groove 8 and lockable in relation to same.

With reference to FIG. 1, a portable power saw 10 is shown attached to a guide plate 11. Said guide plate 11 can, with the attached saw, manually be moved along the guiding members 2, 2', and a movement in direction towards the support member 4 causes a cutting operation to be performed with regard to a work piece inserted under the guiding members 2, 2' between the distance members 3, 3'. The height of said distance members 3, 3' from the base plate 1 is chosen in such a way, that it is suited for the diameter of the saw blade, e.g. in such a way that the work piece can be fully cut by the saw blade.

The embodiment shown in FIG. 1 is an example of a basic embodiment, which can be built as a combination of e.g. wood and metal for an extremely low cost. The work piece is inserted under the guiding members 2, 2' in the space between the distance members 3, 3' and pressed against the support members 4, which have been preadjusted for desired cutting operation. The power saw 10, which is attached to the guide plate 11 by means of attachment members, (not shown) is thereafter moved in direction towards the workpiece, and the cutting operation is thus performed. In order to prevent return movement of the guide plate 11 and the attached saw 10, the guide plate 11 may be provided with a member preventing the saw guard from being released from a returned position, unless the guide plate 11 and the attached saw 10 is removed from the guiding members 2, 2'. Said means can for example be a resillient means, arranged in contact with one of the guiding members 2, 2', which locks the saw guard in returned position, when in contact with the guiding member, arranged to released the saw guard if the guide plate 11 with attached saw 10 is removed, thus preventing the operator from being injured if the guide plate 11 and attached saw 10 is lifted while the saw 10 is running. Since said means can be designated in a number of ways, e.g. as a blade spring, it is not shown or described in detail.

The above described basic embodiment is further provided with stop means 12, 12' at the free end portions of the guiding members 2, 2', arranged to contact the guide plate 11 when said plate 11 is located adjacent to the outer positions of movement, whereby the saw 10 and the guide plate 11 can not be unintentionally moved too far off the near end of the guiding members.

Figure 3:
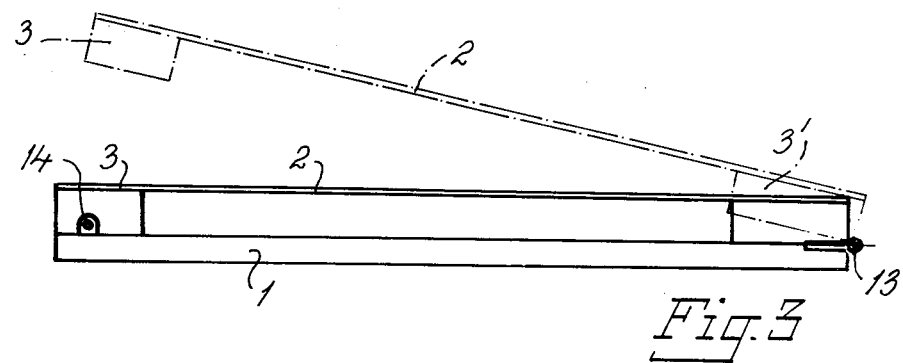
FIG. 3 is a longitudinally extending section of a further modification of the device shown in FIG. 1.

A disadvantage with the above described basic embodiment illustrated in FIG. 1 is, that a long work piece must be pushed under the guiding means 2, 2' before the cutting operation can start. Said insertion operation can in certain cases cause difficulties, which are completely eliminated by the modification shown in FIG. 3. By arranging the guiding means 2, 2' to pivot upwards, the device can easily be applied at any desired point along a work piece. According to FIG. 3, a hinge means 13 is arranged at the point of connection between distance member 3' and the base plate 1, and guiding and locking means 14 are arranged at the point of connection between the distance members 3 and the base plate 1. By operating the last mentioned means 14, the distance members 3, 3' and the guiding members 2, 2' can thus pivot upwards from the base plate 1, whereby the work piece can easily be inserted. It should be emphazised that a corresponding effect can also be achieved if the hinge means 13 and the guiding/locking means 14 are arranged between the guiding members 2, 2' and the distance members 3, 3'.

Figure 2:
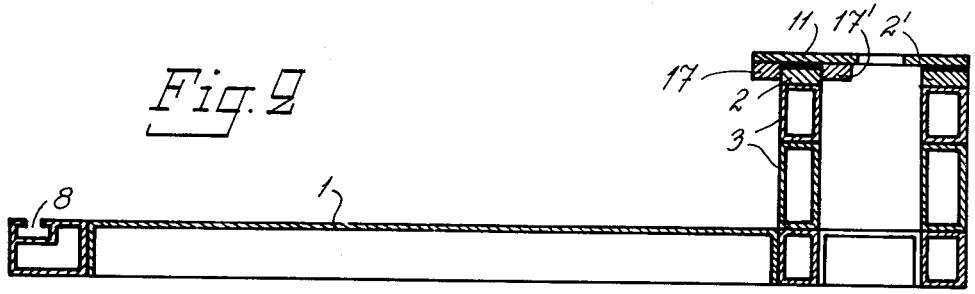
FIG. 2 is a cross-sectional view of a slightly modified embodiment of the device shown in FIG. 1.

In order to further increase the field of use for the device, the device can be further modified. FIG. 2 is a cross-sectional view showing how the device may be built up by means of hollow bodies, intended to reduce the weight of the device, and the distance members 3, 3' are separate parts, joined to each other by means of screws or similar means. It is advantageous to divide the distance members 3, 3', since the height from the base plane, which is the supporting plane for the work piece, can be varied to the guide plate 11, by using distance member 3, 3' which can be adjustable in height. By removing for example one element out of each distance member 3, 3', a saw blade having a smaller diameter can be used, and by attaching a larger number of distance member elements, saw blades having a larger diameter can be utilized. This method makes it possible to use the device in combination with various sizes of marketed portable power saws.

Figure 5:
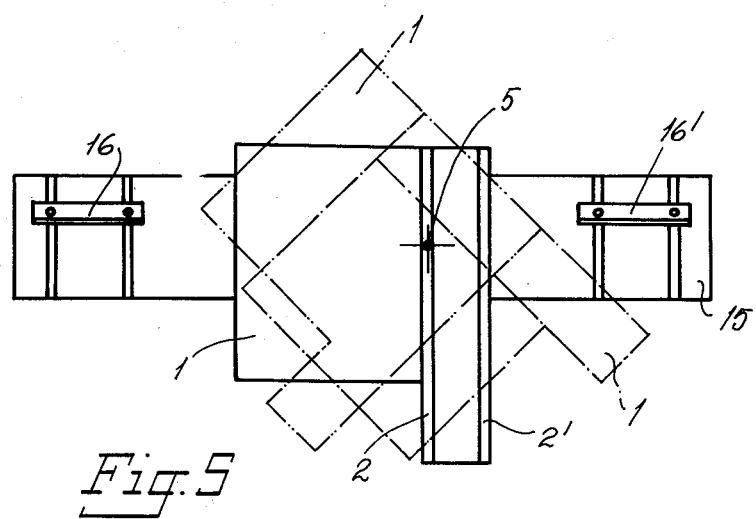
FIG. 5 is a view from above of an embodiment of the device according to FIG. 1, arranged with an auxiliary member, intended to further increase the field of use for the device.

For certain operations, e.g. mitre cuts, it is desireable to adjust the saw in very short time and the embodiment shown in FIG. 5 is an example of how this can be accomplished. The device is a unit attached to a sub-plate 15, arranged with a stud extending towards the device, insertable into a hole not shown. The device can thus pivot around the stud and be locked in desired angular positions against the sub-plate 15 by means of locking members, e.g. dowels or similar means. This makes it possible to adjust the device in a number of predetermined angular positions in relation to a work piece extending in the longitudinal direction of the sub-plate 15. Said sub-plate 15 is also, as shown, arranged with adjustable guide members 16, 16', in order to facilitate necessary alignment of the work piece. If desired, stop means for the work piece can also be arranged at the sub-plate 15 in order to faciliate cutting of a number of work pieces having equal length. Furthermore, a locking means can also be arranged to lock the device in relation to the sub-plate 15 in any desired angular position, e.g. by utilizing a screw or similar means arranged to lock the plates in relation to each other.

The shown and described embodiments include guiding members 2, 2' having a basically rectangular cross-section, which cooperate with the guide plate 11 by having 11 attached guiding means 17, 17' (FIG. 2) arranged to guide the guide plate 11 and the attached saw 10 along at least one guiding member 2, 2'. The guiding members 2, 2' can obviously also be arranged with any cross-sectional configuration, such as circular, semi-circular, triangular or any other suitable shape, in which case the guide plate 11 and the attached cooperating guiding means 17, 17' are arranged to suit the shape of the longitudinally extending guiding members 2, 2'.

Furthermore, the device can also be built up mechanically in a number of different ways by plate shaped material, or by profiles, as well as combinations of wood and metal.

Important and characteristic features for the device are thus, that it includes a guide plate 11 to which a portable power saw 10 is detachably attached, and that said guide plate 10 in co-operation with longitudinally extending guiding members 2, 2' can be moved over a work piece, inserted under the guiding members 2, 2'. The work piece can alternatively be supported in relation to the direction of movement for the saw 10 along the guiding members 2, 2' by means of an adjustable support 4, which is pivotably arranged at a point adjacent to the guiding members 2, 2' and lockable in desired angular relationship in relation to the longitudinally extending direction of the guiding members 2, 2', or, the guiding members 2, 2' can as a unit be pivoted to a desired angular relationship in relation to the longitudinally extending direction of a work piece, and be locked in said position.

Further characteristic features of the present invention are, that the guiding members 2, 2' can be pivotable in an upward direction from the work piece in order to facilitate introduction of the work piece, and that the height of the guiding members 2, 2' in relation to the work piece also can be varied, in order to make it possible to utilize saws 10 with varying saw blade diameters.

The embodiments shown and described are only examples of embodiments within the scope of the present invention and the following claims, since many modifications are possible, maintaining the important and characteristic features of the present invention.

I claim:

1. In a device for use with a portable power saw wherein the saw is supported for linear movement on parallel guide bars above a base plate whereby the saw blade extends below the guide bars to cut the workpiece which is supported beneath it, the improvement comprising a guide plate to which the saw is attachable adapted for sliding movement on said guide bars, said guide bars being basically rectangular in cross-section, guide blocks depending from the bottom of said guide plate in abutting sliding relation with both sides of at least one of said guide bars, support blocks attached at their lower ends to the base plate and at their upper ends to the ends of said guide bars to support the guide bars in spaced relationship to the base plate, a work piece guide comprising an elongated bar shaped member pivotally connected at one end in proximity to the guide bars and having an elongated slot in the other end extending substantially parallel to the longitudinal axis of the work piece guide, an inverted T slot in the top face of the base plate under the slot in the work piece guide and substantially parallel to the guide bars, a threaded knob extending through said slots and engaging a threaded member within said T slot adapted to clamp the work piece guide in any desired angular position with respect to the guide bars, the height of the guide bars above the base plate being adjustable by providing a plurality of hollow support blocks having means to attach them to each other.

2. The device in accordance with claim 1 further comprising a hinged connection between the base plate and the support blocks at one end of the guide bars so that said guide bars and attached saw can be raised upwardly at one end and a locking means on the support blocks at the other end of the guide bars adapted to selectively secure said other end to the base plate.

3. The device of claim 2 further comprising a sub-plate underneath the base plate, means to pivotally connect the base plate to the sub-plate for horizontal pivotal movement, and work piece guide means adjustably mounted on said sub-plate in cooperating relationship with the pivotable base plate so that any desired angular cut can be made by rotating the base plate, and means to lock said base plate in the desired position.

* * * * *